United States Patent
Hong

(10) Patent No.: US 9,021,886 B2
(45) Date of Patent: May 5, 2015

(54) PRESSURE GAUGE

(71) Applicant: Active Tools International (HK) Ltd, Causeway Bay (HK)

(72) Inventor: Ying Chi Hong, Causeway Bay (HK)

(73) Assignee: Active Tools International (HK) Ltd., Causeway Bay (HK)

( * ) Notice: Subject to any disclaimer, the term of this patent is extended or adjusted under 35 U.S.C. 154(b) by 125 days.

(21) Appl. No.: 13/957,834

(22) Filed: Aug. 2, 2013

(65) Prior Publication Data

US 2015/0033867 A1  Feb. 5, 2015

(51) Int. Cl.
*G01L 7/00* (2006.01)
*G01L 9/08* (2006.01)
*G01L 7/18* (2006.01)
*G01L 7/06* (2006.01)

(52) U.S. Cl.
CPC . *G01L 9/08* (2013.01); *G01L 7/182* (2013.01); *G01L 7/06* (2013.01)

(58) Field of Classification Search
USPC .................................................. 73/700–756
See application file for complete search history.

(56) References Cited

U.S. PATENT DOCUMENTS

| | | | | |
|---|---|---|---|---|
| 3,921,455 A * | 11/1975 | Staubli et al. | .................... | 73/741 |
| 3,975,959 A * | 8/1976 | Larkin | ............. | 73/744 |
| 4,192,193 A * | 3/1980 | Schnell | ........................... | 73/739 |
| 4,685,336 A * | 8/1987 | Lee | .................. | 73/715 |
| 5,303,587 A * | 4/1994 | Garraffa et al. | ................. | 73/300 |
| 5,796,008 A * | 8/1998 | Stoll et al. | ....................... | 73/740 |

FOREIGN PATENT DOCUMENTS

EP   1014065 A1 *  6/2000

* cited by examiner

*Primary Examiner* — Andre Allen
(74) *Attorney, Agent, or Firm* — Raymond R. Ferrera; Adams and Reese LLP

(57) ABSTRACT

A pressure gauge is provided, which comprises a pedestal, a spring tube, a needle pivot, a needle and a indicating panel. The spring tube is connected to the needle pivot and able to drive the needle pivot to rotate. A fixing portion is provided on one end of the spring tube. The pedestal is provided with a mounting portion, and the mounting portion is provided with an open slot. The fixing portion is installed in the open slot. The pressure gauge has a simple structure and low cost.

10 Claims, 7 Drawing Sheets

PRESSURE GAUGE

FIELD OF THE INVENTION

The present invention relates to the field of industrial instrument, and more particularly, relates to a pressure gauge.

BACKGROUND OF THE INVENTION

The pressure in the pressure vessels generally will be measure by a pressure gauge in the prior art. The operational principle of the common pressure gauge is as follows: a displacement of the free end of the spring tube will be caused when the air in the pressure tube enters the C-shaped spring tube (the spring tube will expand outward when the measured pressure is larger than the atmospheric pressure, and the spring tube will contract inward when the measured pressure is smaller than the atmospheric pressure), then the air will pass mechanisms comprising the driving and zooming mechanism, the fan-shaped gear and the mini gear, etc. to drive the needle to deflect, and thus indicating the amount of the pressure. Such a pressure gauge has a complex structure and a high cost.

SUMMARY OF THE INVENTION

The object of the present invention is to provide a pressure gauge that has a simple structure and low cost, aiming at the drawbacks that the pressure gauge in the prior art is complex in structure and high in cost.

The technical schemes to solve the above technical problems are as follows.

A pressure gauge is provided, it comprises a pedestal, a C-shaped spring tube set on the pedestal, a needle pivot rotatably mounted on the pedestal, a needle fixedly connected to the needle pivot and a indicating panel, the spring tube is connected to the needle pivot and able to drive the needle pivot to rotate, wherein, a fixing portion is provided on one end of the spring tube, the fixing portion is bending to the centre of the pedestal and communicated to the spring tube; the pedestal is provided with a convex mounting portion set on the face adjacent to the spring tube, and the mounting portion is provided with an open slot matched with the fixing portion; the fixing portion is installed in the open slot; a first through-hole for gas flowing is provided on the bottom of the open slot, and the first through-hole is communicated to the fixing portion.

In the pressure gauge of the present invention, the mounting portion comprises a cylinder set at the centre of the pedestal and a mounting panel stretching outwards along the outer circumferential surface of the cylinder; the open slot extends from the centre of the cylinder towards the mounting panel, and the opening of the open slot is set on the side of the mounting panel which is away from the cylinder.

In the pressure gauge of the present invention, the pressure gauge further comprises a connecting tube; one end of the connecting tube is communicated to the fixing portion, and the other end of the connecting tube is communicated to the first through-hole.

In the pressure gauge of the present invention, the indicating panel is fixed on the mounting portion via a first threaded member.

In the pressure gauge of the present invention, the pressure gauge further comprises a transparent cap and a shell; the pedestal, the spring tube, the needle pivot, the needle and the indicating panel are installed inside the shell; the transparent cap is mounted on the top of the shell.

In the pressure gauge of the present invention, the pressure gauge further comprises a drawbar; one end of the drawbar is connected to the end of the spring tube which is away from the fixing portion, and the other end of the drawbar is connected to the needle pivot.

In the pressure gauge of the present invention, each of the two ends of the drawbar is provided with a hook portion; the two hook portions are bended to each other; a connecting strap is provided on the end of the spring tube which is away from the fixing portion; a first connecting hole is provided on the connecting strap; an annular boss coaxial with the needle pivot is provided on the outer circumferential surface; a second connecting hole is provided on the annular boss; the two hook portions are respectively clamped by the first connecting hole and the second connecting hole.

In the pressure gauge of the present invention, a threaded connecting member for mounting the pressure gauge on the pressure vessel is provided at the centre of the bottom of the pedestal; the threaded connecting member is provided with a second through-hole; the second through-hole is communicated to the first through-hole.

In the pressure gauge of the present invention, two defining members for defining the rotating range of the needle are mounted on the indicating panel.

In the pressure gauge of the present invention, a graduation identification is set on the indicating panel; a high-accuracy indicating area is set on the graduation identification.

The following beneficial effects will be achieved when implementing the embodiments of the present invention. The pressure gauge comprises a fixing portion, a mounting portion, an open slot, a first through-hole and so on. The fixing portion is set at one end of the spring tube. The mounting portion is set on the face of the pedestal, and the face of the pedestal is adjacent to the spring tube. The open slot for mounting the fixing portion is set on the mounting portion. The first through-hole for passing through the gas is set at the bottom of the open slot, and the first through-hole is communicated to the fixing portion. The pressure gauge has a simple structure and low cost.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the objects, technical schemes and advantages more clearly, the present invention may be further described in detail with reference to the accompanying drawings and embodiments.

Figure 1:
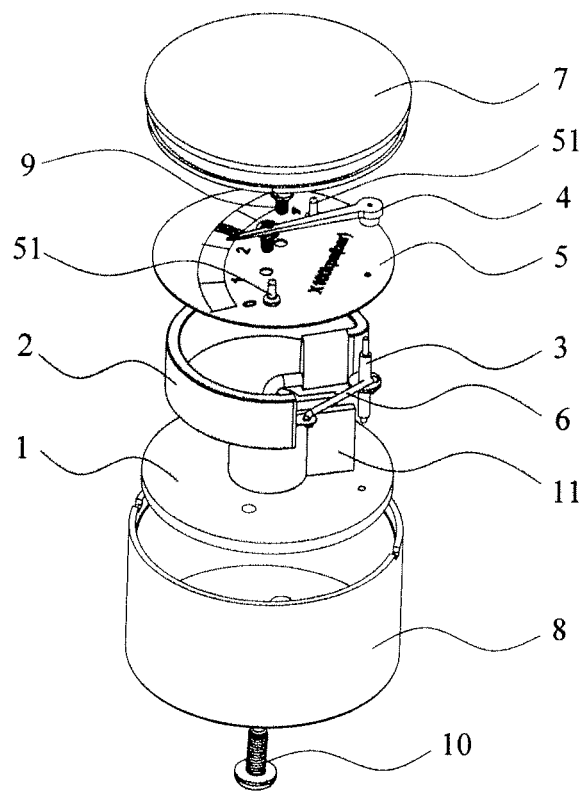
FIG. 1 is an explosive diagram for a pressure gauge according to a preferred embodiment of the present invention.
Figure 2:
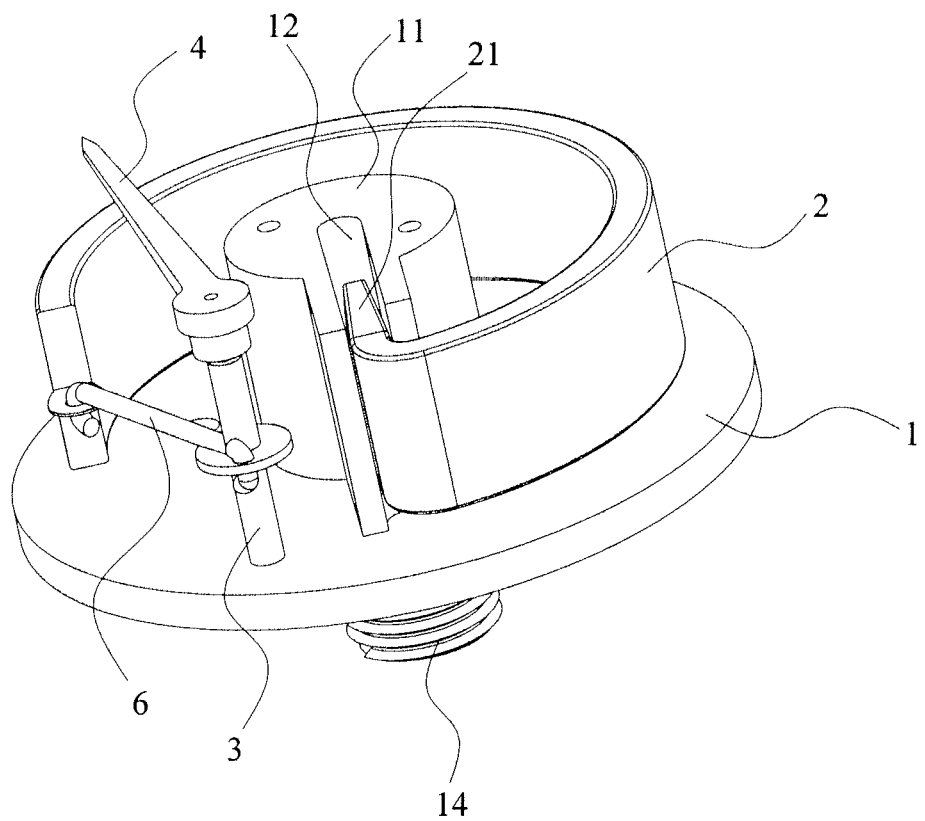
FIG. 2 is a three-dimensional structural diagram for the inside of the pressure gauge shown in FIG. 1.
Figure 3:
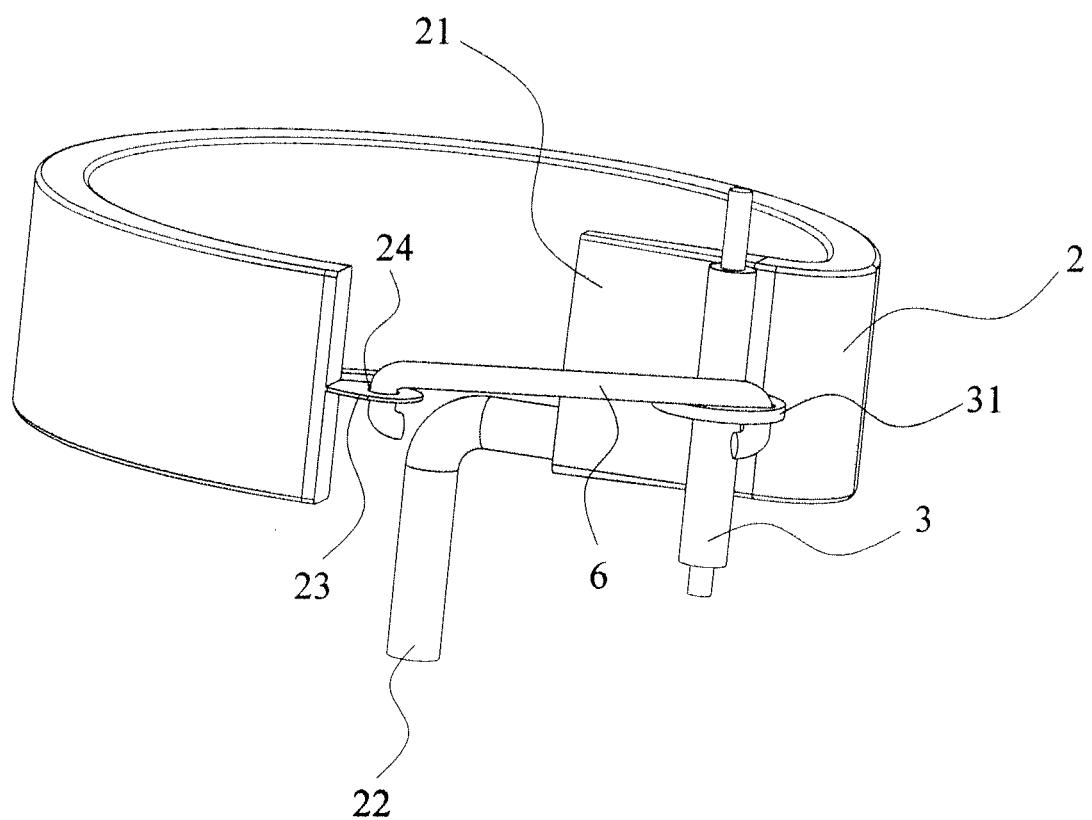
FIG. 3 is a three-dimensional structural diagram for the connection between the spring tube and the needle pivot via the drawbar in the pressure gauge shown in FIG. 1.

Referring to FIGS. 1, 2 and 3, a pressure gauge is provided in a preferred embodiment of the present invention, which comprises a pedestal 1, a spring tube 2, a needle pivot 3, a needle 4 and a indicating panel 5. The pedestal 1 is substantially has a structure like a disk. The spring tube 2 is C-shaped and set on the pedestal 1. The spring tube 2 can also be regarded as a Burdon tube. The spring tube 2 will contract inward or expand outward when the gas in the pressure vessel enters the inside of the spring tube 2. The needle pivot 3 is substantially a cylinder and rotatably mounted on the pedestal 1. The spring tube 2 is connected to the needle pivot 3 to drive the needle pivot 3 to rotate. The needle pivot 3 runs through the indicating panel 5 to be fixedly connected to the needle 4, so as to drive the needle 4 to rotate when it is rotating. In the case, a fixing portion 21 bending to the centre of the pedestal is provided on one end of the spring tube 2, and the fixing portion 21 is communicated to the spring tube 2 and fixedly connected to the spring tube 2. It should be understood that the fixing portion 21 and the spring tube 2 can be integrally formed since both of them are made from alike material and with alike shape.

Figure 4:
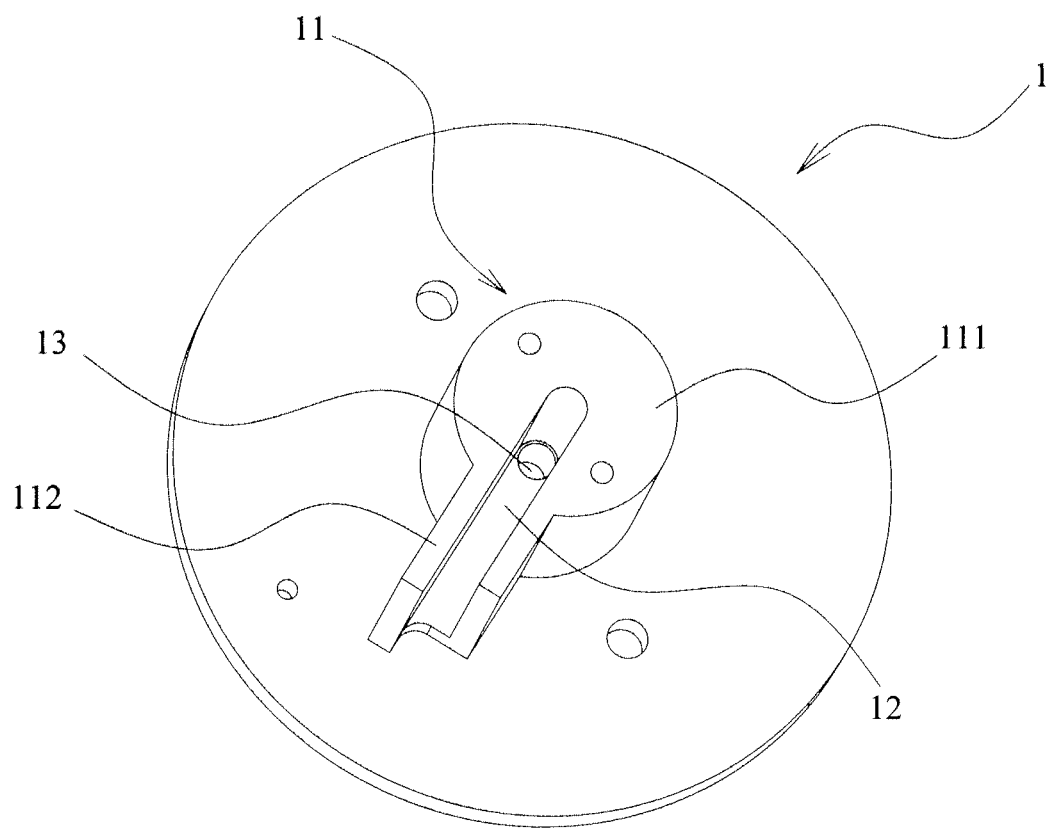
FIG. 4 is a three-dimensional structural diagram for the pedestal in the pressure gauge shown in FIG. 1.

Referring to FIG. 4, a convex mounting portion 11 is provided at the top of the pedestal 1. The mounting portion 11 is provided with an open slot 12 matched with the fixing portion 21. The open slot 12 is substantially waist-shaped and the fixing portion 21 is installed in the open slot 12, so that the spring tube 2 can be set on the pedestal 1 fixedly. In the embodiment, the mounting portion 11 comprises a cylinder 111 set at the centre of the pedestal 1 and a mounting panel 112 stretching outwards along the outer circumferential surface of the cylinder 111. The open slot 12 extends from the centre of the cylinder 111 towards the mounting panel 112, and the opening of the open slot 12 is set on the side of the mounting panel 112 which is away from the cylinder 111. It should be understood that the mounting portion 11 has other structures, for example, the mounting portion 11 has a structure like a rectangular parallelopiped or a cube, etc.

A first through-hole 13 for gas flowing is provided on the bottom of the open slot 12. In the embodiment, the first through-hole 13 is a circular hole that is communicated to the fixing portion 21. It should be understood that a structure that is communicated to the first through-hole 13 is provided in the fixing portion 21, so that the gas in the first through-hole 13 can flow into the fixing portion 21. When the pressure gauge is used to measure the pressure in the pressure vessel, the gas in the pressure vessel will flow through the first through-hole 13 and the fixing portion 21 successively and then enter the spring tube 2. The spring tube 2 will contract inward or expand outward. In the case, the needle 4 will be driven to rotate by the spring tube 2 through the needle pivot 3, and thus indicating the amount of the pressure in the pressure vessel.

Figure 8:
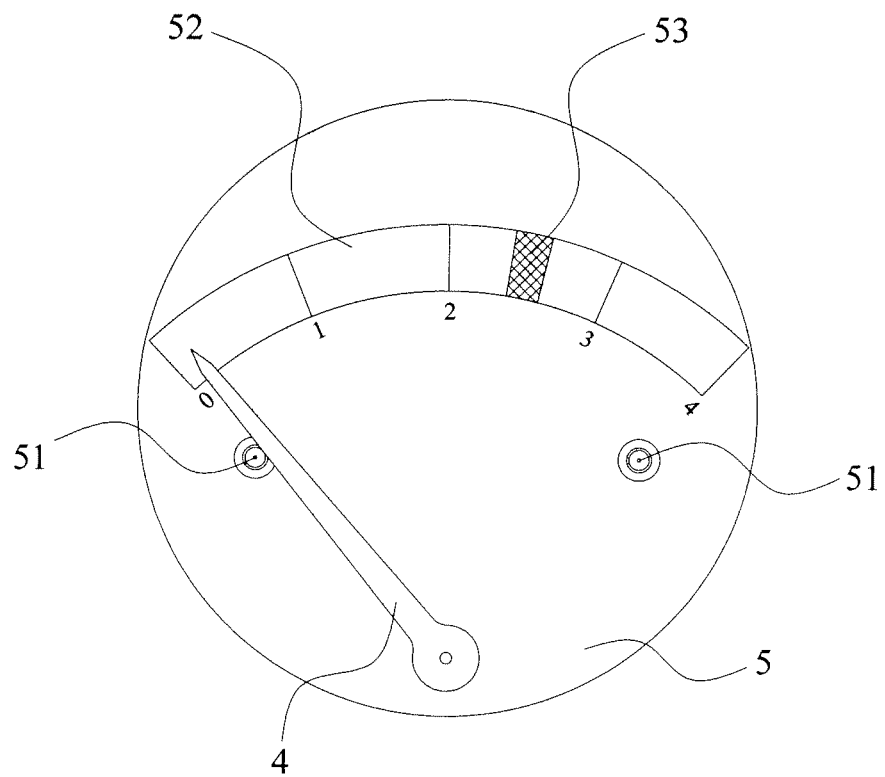
FIG. 8 is a structural diagram for the indicating panel in the pressure gauge shown in FIG. 1.

Referring to FIG. 8, in the embodiment, a graduation identification 52 is set on the indicating panel 5 to indicate the amount of the pressure. A high-accuracy indicating area 53 is set on the graduation identification 52, which is the area with the highest accuracy and smallest deviation on the pressure gauge. When the needle 4 is rotated to the high-accuracy indicating area 53, it is meant that the amount of the pressure measured by the pressure gauge has a smallest deviation. The high-accuracy indicating area 53 can be designed based on the characteristic, such as the thickness, volume and the like, of the adopted spring tube 2. It should be understood that the data range of the high-accuracy indicating area 53 will be different if the adopted spring tube 2 is different. The pressure gauge can measure a certain pressure spot with high accuracy. With the above structure, the manufacturing process of the pressure gauge can be simplified, and thus reducing the manufacturing cost of the pressure gauge.

Specifically, referring to FIG. 3, in the embodiment, the pressure gauge further comprises an L-shaped connecting tube 22. One end of the connecting tube is communicated to the fixing portion 21, and the other end of the connecting tube is communicated to the first through-hole 13. It should be understood that the connecting tube 22 is not limited to an L-shaped structure, other structures, such as strip-shaped, can be adopted as well, as long as the first through-hole 13 is enabled to be communicated to the fixing portion 21.

Referring to FIG. 1, two defining members 51 are mounted on the indicating panel 5. The defining member 51 is has a structure like a round rod. The two defining members 51 are set on two sides of the graduation identification 52 in the indicating panel 5 to define the rotating range of the needle 4. In the embodiment, the defining member 51 may has a structure like a threaded connecting member or a pin. The indicating panel 5 is fixed on the mounting portion 11 via a first threaded member 9. In the embodiment, there are two first threaded members 9. The two first threaded members 9 are arranged evenly and connected fixedly to the top of the mounting portion 11 through the indicating panel 5. Referring to FIG. 1, the pressure gauge further comprises a transparent cap 7, a shell 8 and a second threaded member 10. The pedestal 1, the spring tube 2, the needle pivot 3, the needle 4 and the indicating panel 5 are installed inside the shell 8. The transparent cap 7 is mounted on the top of the shell 8, and thus sealing the above components in the space formed by the transparent cap 7 and the shell 8. The second threaded member 10 is passed through the shell 8 and connected to the bottom of the pedestal 1, so as to mount the shell 8 fixedly on the pedestal 1. In the embodiment, there are two second threaded members 10 and both of them are arranged evenly on the shell 8. It should be understood that the amount of the first threaded member 9 and the second threaded member 10 can be varied.

Figure 7:
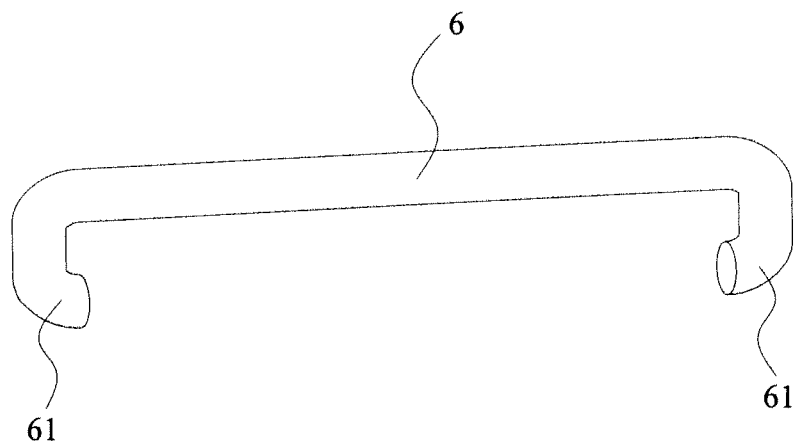
FIG. 7 is a three-dimensional structural diagram for the drawbar in the pressure gauge shown in FIG. 1.

Referring to FIGS. 1 and 7, in the embodiment, the pressure gauge further comprises a drawbar 6. One end of the drawbar 6 is connected to the end of the spring tube 2 which is away from the fixing portion 21, and the other end of the drawbar 6 is connected to the needle pivot 3.

Furthermore, each of the two ends of the drawbar 6 is provided with a hook portion 61. The two hook portions 61 are connected to the spring tube 2 and the needle pivot 3 respectively.

Figure 6:
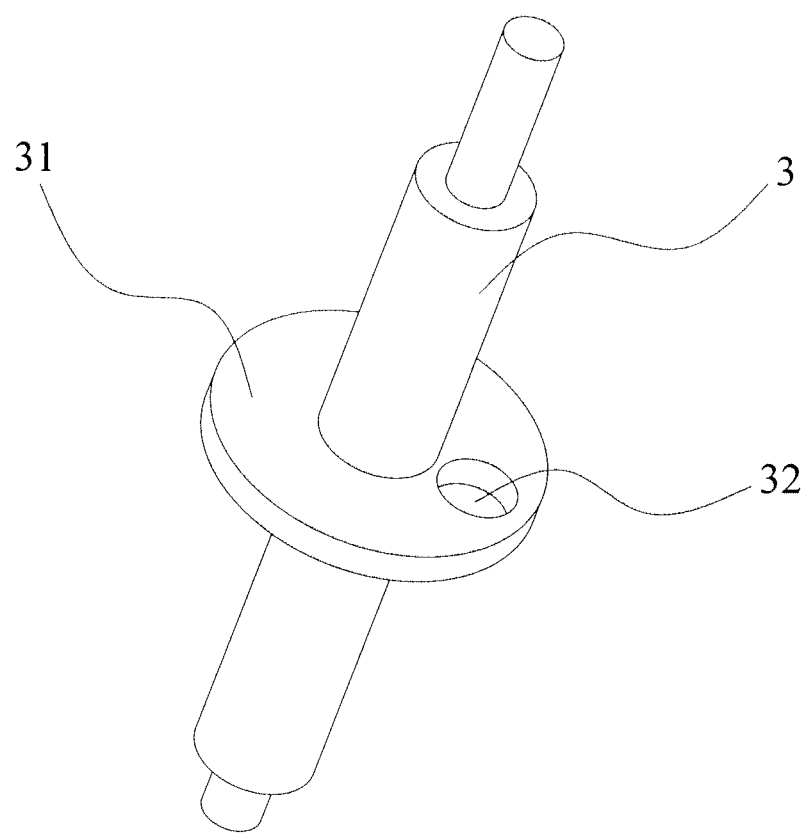
FIG. 6 is a three-dimensional structural diagram for the needle pivot in the pressure gauge shown in FIG. 1.

Furthermore, referring to FIG. 3, a connecting strap 23 is provided on the end of the spring tube 2 which is away from the fixing portion 21. The connecting strap 23 has a substantially circular and schistose structure. A first connecting hole 24 is provided on the connecting strap 23. Referring to FIG. 6, an annular boss 31 is provided on the outer circumferential surface of the needle pivot 3, and the annular boss 31 and the needle pivot 3 are coaxial. A second connecting hole 32 is provided on the annular boss 31. The two hook portions 61 are respectively clamped by the first connecting hole and the second connecting hole, so that the drawbar 6 can be connected between the spring tube 2 and the needle pivot 3.

Figure 5:
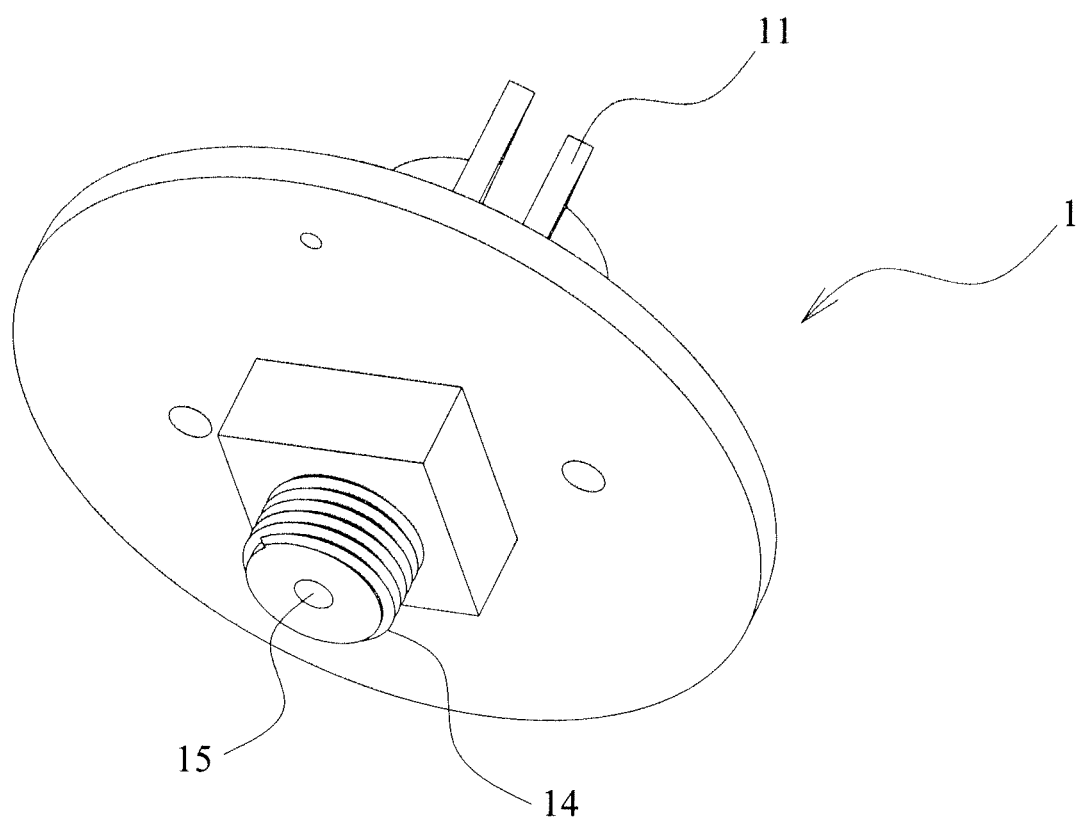
FIG. 5 is another three-dimensional structural diagram for the pedestal in the pressure gauge shown in FIG. 1.

Referring to FIG. 5, in the embodiment, a threaded connecting member 14 is provided at the centre of the bottom of the pedestal 1. The threaded connecting member 14 is an outer threaded connecting member. The pressure gauge can be mounted on the pressure vessel via the threaded connecting member 14. The threaded connecting member 14 is provided with a second through-hole 15. The second through-hole 15 is a circular hole that is communicated to the first through-hole 13. In the embodiment, the second through-hole 15 and the threaded connecting member 14 are coaxial, and the second through-hole 15 and the first through-hole 13 are coaxial. When the pressure gauge is used to measure the pressure in the pressure vessel, the gas in the pressure vessel will flow through the second through-hole 15, the first through-hole 13 and the fixing portion 21 successively and then enter the spring tube 2, and thus the spring tube 2 contracting inward or expanding outward.

While the present invention has been described with reference to preferred embodiments, it will be understood by those skilled in the art that various changes and equivalents may be substituted without departing from the scope of the present invention, and those various changes and equivalents shall fall into the protection of the invention.

The invention claimed is:

1. A pressure gauge comprises a pedestal, a C-shaped spring tube set on the pedestal, a needle pivot rotatably mounted on the pedestal, a needle fixedly connected to the needle pivot and a indicating panel, the spring tube is connected to the needle pivot and able to drive the needle pivot to rotate, wherein, a fixing portion is provided on one end of the spring tube, the fixing portion is bending to the center of the pedestal and communicated to the spring tube; the pedestal is provided with a convex mounting portion set on the face adjacent to the spring tube, and the mounting portion is provided with an open slot matched with the fixing portion; the fixing portion is installed in the open slot; a first through-hole for gas flowing is provided on the bottom of the open slot, and the first through-hole is communicated to the fixing portion.

2. The pressure gauge of claim 1, wherein the mounting portion comprises a cylinder set at the centre of the pedestal and a mounting panel stretching outwards along the outer circumferential surface of the cylinder; the open slot extends from the centre of the cylinder towards the mounting panel, and the opening of the open slot is set on the side of the mounting panel which is away from the cylinder.

3. The pressure gauge of claim 1, wherein the pressure gauge further comprises a connecting tube; one end of the connecting tube is communicated to the fixing portion, and the other end of the connecting tube is communicated to the first through-hole.

4. The pressure gauge of claim 1, wherein the indicating panel is fixed on the mounting portion via a first threaded member.

5. The pressure gauge of claim 1, wherein the pressure gauge further comprises a transparent cap and a shell; the pedestal, the spring tube, the needle pivot, the needle and the indicating panel are installed inside the shell; the transparent cap is mounted on the top of the shell.

6. The pressure gauge of claim 1, wherein the pressure gauge further comprises a drawbar; one end of the drawbar is connected to the end of the spring tube which is away from the fixing portion, and the other end of the drawbar is connected to the needle pivot.

7. The pressure gauge of claim 6, wherein each of the two ends of the drawbar is provided with a hook portion; the two hook portions are bended to each other; a connecting strap is provided on the end of the spring tube which is away from the fixing portion; a first connecting hole is provided on the connecting strap; an annular boss coaxial with the needle pivot is provided on the outer circumferential surface; a second connecting hole is provided on the annular boss; the two hook portions are respectively clamped by the first connecting hole and the second connecting hole.

8. The pressure gauge of claim 1, wherein a threaded connecting member for mounting the pressure gauge on the pressure vessel is provided at the centre of the bottom of the pedestal; the threaded connecting member is provided with a second through-hole; the second through-hole is communicated to the first through-hole.

9. The pressure gauge of claim 1, wherein two defining members for defining the rotating range of the needle are mounted on the indicating panel.

10. The pressure gauge of claim 1, wherein a graduation identification is set on the indicating panel; a high-accuracy indicating area is set on the graduation identification.

* * * * *